United States Patent [19]

Hicks

[11] Patent Number: 4,504,603

[45] Date of Patent: Mar. 12, 1985

[54] FIRE-RETARDANT POLYURETHANE FOAM CONTAINING FINELY GROUND DRY FIRE RETARDANT PARTICLES CONTAINING A VOLATILE ACTIVE FIRE RETARDANT COMPONENT

[76] Inventor: Hamilton Hicks, 60 Butternut Hollow, Greenwich, Conn. 06830

[21] Appl. No.: 535,058

[22] Filed: Sep. 23, 1983

[51] Int. Cl.³ .............................................. C08G 18/14
[52] U.S. Cl. ..................................... 521/85; 521/103; 521/106; 521/123; 521/128; 521/906
[58] Field of Search ................. 521/85, 103, 106, 123, 521/128, 906

[56] References Cited

U.S. PATENT DOCUMENTS 3,330,783  7/1967  Piechota et al. ..................... 521/906
4,315,078  2/1982  Anonga ............................... 521/103

Primary Examiner—Maurice J. Welsh
Attorney, Agent, or Firm—Kenyon & Kenyon

[57] ABSTRACT

A molded polyurethane foamed shape has finely ground dry fire-retardant particles containing a volatile active fire-retardant component which releases fire-retardant gas when exposed to fire and distributed throughout the shape and encapsulated by the polyurethane so as to protect the component against evaporation until exposed by initial burning of the shape.

4 Claims, No Drawings

FIRE-RETARDANT POLYURETHANE FOAM CONTAINING FINELY GROUND DRY FIRE RETARDANT PARTICLES CONTAINING A VOLATILE ACTIVE FIRE RETARDANT COMPONENT

Polyurethane foam is used for airplane and automobile seats and other purposes. It is flammable and when burning produces toxic gases, characteristics which have caused passenger deaths to occur. It has been extensively used in airplane and automobile seats because of its pleasant resiliant characteristic and because it can be molded to the shapes required. Now it has become important to make the foam fire retardant.

Polyurethane foam shapes are molded by using a two part mold which when closed form a cavity of the desired shape and into one of which a just blended polyurethane, foaming agent and a catalyst are poured and the other mold part is quickly closed on the first part to form the cavity. The amount of the blend is proportioned to only partly fill the cavity prior to foaming. The polyurethane foams quickly and fills the mold cavity, after which the mold is opened and the molded shape is removed.

Known methods of applying a fire retardant to the polyurethane foam shape, are ineffective. For other materials it is known that various dry fire-retardant substances can be ground and incorporated with water and applied by painting, spraying etc, with some effectiveness.

One problem has been that such fire retardants include active components which are essentially volatile so that if applied to the surface of the foam their effectiveness after drying is short lifed.

The present inventor has discovered that when such fire-retardant substances are finely powdered and blended dry directly into the polyurethane blend prior to its foaming, they are distributed during foaming throughout the foam as fine particles which are encapsulated by the polyurethane so as to protect them from evaporation after foaming is completed. Protection against being worn away as in the case of a surface application, is also provided. The fire-retardant particles remain substantially unchanged until released by initial burning of the foam, at which time they become effective as a fire retardant.

For the above purpose, of the various known fire-retardants, ammonium phosphate, ammonium chloride, sodium bicarbonate and borax have been found to be most effective. These are mixed and before or after mixing are finely ground. For testing purposes 4 ounces of ammonium phosphate, 8 ounces of ammonium chloride, 6 ounces of sodium bicarbonate and 6 ounces of borax are made into a fine grind to make 24 ounces of powdered fire-retardant mix. This mix is blended into 100 grams of polyurethane of the commercially available foaming type, a commerical catalyst is added and this polyurethane blend is inserted in the mold and the mold is immediately closed, foaming starting almost immediately so that the mold is filled and a molded shape produced with the fine particles of fire retardant encapsulated by the polyurethane.

Resulting moldings have been tested by the application of flame and it was found that the fire-retardant component went into action immediately and completely stopped burning of the foam and the resulting toxic smoke. This is important not only in seating material and the like but also in the foam insulation used in housing for thermal insulation.

In the foregoing 25 to 30 grams of the finely ground fire-retardant mix was used per the 100 grams of polyurethane liquid material. These were mixed in the polyurethane liquid at high speed to effect a complete disbursion. 50 grams of the catalyst were then quickly blended and the result poured quickly into the mold so that the polyurethane test product was produced.

It is believed that there are two reactions taking place when fire impinges on the foam, both being thermal in nature. The borax turns slightly acidic and activates the release of carbon dioxide from the sodium bicarbonate. This reaction only takes place when fire hits the foam. The finely ground mix of retardants although dry in the foam encapsulated by the polyurethane, are released when burning is initiated. The fire creates a very small amount of water which causes a fast release of the carbon dioxide from the sodium bicarbonate because of an acid release caused or manufactured during burning by the borax. Thereafter or at a slower rate the heat causes the release of ammonia gas from the ammonium phosphate and ammonium chloride, so that the hot foam is prevented from reigniting after being initially smothered by the carbon dioxide. These reactions take place in a fraction of a second to knock out fire and then prevent flare-up and toxic smoke.

The addition of the fire-retardant mix described herein before, increases the density of the foam, but this density is always dependant on the relationship between the amount of polyurethane blend charged as related to the volume of the mold cavity in which the foaming occurs. This applies whether or not the blend is used alone or in accordance with the practice of the present invention. Any practical degree of density can be obtained in either case.

What is claimed is:

1. A molded polyurethane foamed shape having finely ground dry fire retardant particles containing a volatile active fire retardant component which release fire-retardant gas when exposed to fire and distributed throughout the shape and encapsulated by the polyurethane so as to protect said component against evaporation until exposed by initial burning of the shape.

2. The shape of claim 1 in which said fire retardant particles comprise a mixture of ammonium phosphate, ammonium chloride, sodium carbonate and borax.

3. A method for making a fire retardant polyurethane shape, comprising mixing finely ground particles of a solid fire retardant containing a volatile active component which release fire-retardant gas when exposed to fire in a blend of polyurethane, foaming agent and catalyst, to form a mix, and placing the mix in a die in which the mix foams to form the shape with said particles encapsulated by the polyurethane.

4. The method of claim 3 in which said fire retardant particles comprise a mixture of ammonium phosphate, ammonium chloride, sodium carbonate and borax.

* * * * *